(12) United States Patent
Oh et al.

(10) Patent No.: US 10,222,531 B2
(45) Date of Patent: Mar. 5, 2019

(54) BACKLIGHT UNIT INCLUDING ABSORBING MEMBER AT LEAST PARTIALLY RECESSED IN BOTTOM CHASSIS AND LIQUID CRYSTAL DISPLAY DEVICE INCLUDING THE SAME

(71) Applicant: Samsung Display Co., Ltd., Yongin-si, Gyeonggi-Do (KR)

(72) Inventors: Sun Hee Oh, Anyang-si (KR); Dong Yeon Kang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 647 days.

(21) Appl. No.: 14/793,452

(22) Filed: Jul. 7, 2015

(65) Prior Publication Data

US 2016/0170123 A1    Jun. 16, 2016

(30) Foreign Application Priority Data

Dec. 16, 2014  (KR) .................. 10-2014-0181339

(51) Int. Cl.
*G02B 6/00*       (2006.01)
*F21V 8/00*       (2006.01)
(Continued)

(52) U.S. Cl.
CPC ........... *G02B 6/0026* (2013.01); *G02B 5/003* (2013.01); *G02B 6/0023* (2013.01);
(Continued)

(58) Field of Classification Search
CPC ....... G02F 2001/133314; G02F 1/1335; G02F 1/133615; G02B 6/0031; G02B 6/0068;
(Continued)

(56) References Cited

U.S. PATENT DOCUMENTS

| 7,530,723 | B2 * | 5/2009 | Ohno ..................... G02B 6/005 362/612 |
| 9,028,123 | B2 | 5/2015 | Nichol et al. |
| 2006/0285353 | A1 * | 12/2006 | Kim ..................... G02B 6/0046 362/561 |
| 2011/0141397 | A1 * | 6/2011 | Lee ..................... G02B 6/0083 349/64 |
| 2012/0050649 | A1 | 3/2012 | Yeo |

(Continued)

FOREIGN PATENT DOCUMENTS

| KR | 10-2008-0045471 A | 5/2008 |
| KR | 10-2012-0039773 A | 4/2012 |

(Continued)

*Primary Examiner* — Sean Gramling
*Assistant Examiner* — Gerald J Sufleta, II
(74) *Attorney, Agent, or Firm* — H.C. Park & Associates, PLC

(57) ABSTRACT

Provided are a backlight and a liquid crystal display device including the same. The backlight unit includes a light source assembly which emits light; a light guide plate which receives at a light incident surface thereof light from the light source assembly; and a bottom chassis having a bottom unit on which the light guide plate is disposed. The bottom unit of the bottom chassis has a first bottom portion which is arranged in the vicinity of the light incident surface and has a first recess, a second bottom portion which is bent diagonally to the cross sectional surface and has a second recess, and a third bottom portion which is bent at the second bottom portion in the direction parallel to the first bottom portion and disposed higher than the first bottom portion. A light absorbing member is disposed in the first and second recesses.

19 Claims, 10 Drawing Sheets

(51) Int. Cl.
*G02B 5/00* (2006.01)
*G02B 5/22* (2006.01)

(52) U.S. Cl.
CPC ......... *G02B 6/0046* (2013.01); *G02B 6/0068* (2013.01); *G02B 6/0086* (2013.01); *G02B 5/22* (2013.01)

(58) Field of Classification Search
CPC .. G02B 6/0023; G02B 6/0046; G02B 6/0088; G02B 6/0091; G02B 6/0013; G02B 6/0048
USPC ................................ 362/600, 615, 632–633
See application file for complete search history.

(56) References Cited

U.S. PATENT DOCUMENTS

| | | | |
|---|---|---|---|
| 2013/0044515 A1* | 2/2013 | Lu Feng | G02B 6/005 362/609 |
| 2014/0098322 A1 | 4/2014 | Tokuyama et al. | |
| 2015/0070931 A1* | 3/2015 | Lin | G02B 6/0031 362/609 |
| 2015/0226908 A1* | 8/2015 | Kunimochi | G02B 6/0046 362/612 |

FOREIGN PATENT DOCUMENTS

| | | |
|---|---|---|
| KR | 10-2012-0078234 A | 7/2012 |
| KR | 10-2013-0055598 A | 5/2013 |
| KR | 10-2014-0046377 A | 4/2014 |

\* cited by examiner 121-6

121-6

BACKLIGHT UNIT INCLUDING ABSORBING MEMBER AT LEAST PARTIALLY RECESSED IN BOTTOM CHASSIS AND LIQUID CRYSTAL DISPLAY DEVICE INCLUDING THE SAME

CLAIM OF PRIORITY

This application makes reference to, incorporates the same herein, and claims all benefits accruing under 35 U.S.C. § 119 from an application earlier filed in the Korean Intellectual Property Office on 16 Dec. 2014 and there duly assigned Serial No. 10-2014-0181339.

BACKGROUND OF THE INVENTION

Field of the Invention

Exemplary embodiments of the present invention relate to a backlight unit and a liquid crystal display device including the same.

Description of the Related Art

Recently, display devices are being replaced by thin flat panel display devices such as liquid crystal displays (LCDs), organic light emitting diodes (OLEDs), etc.

LCDs among such flat panel display devices may include liquid crystal display panels, and backlight units which provide light to the liquid crystal display panels, and the backlight units may require light guide plates for providing uniform luminance to the liquid crystal display panels.

Various attempts have been made to slim the backlight units by reducing the thickness of the light guide plates, however, a drawback of light leakage may be caused by the reduced thickness of the light guide plates.

The above information disclosed in this Background section is only for enhancement of understanding of the background of the inventive concept, and, therefore, it may contain information that does not form the prior art that is already known in this country to a person of ordinary skill in the art.

SUMMARY OF THE INVENTION

Exemplary embodiments of the present invention provide a backlight unit which may provide uniform luminance.

Exemplary embodiments of the present invention provide a liquid crystal display device which may reproduce clear images using the backlight unit providing uniform luminance.

Additional aspects will be set forth in the detailed description which follows, and, in part, will be apparent from the disclosure, or may be learned by practice of the inventive concept.

According to an exemplary embodiment of the present invention, there is provided a backlight unit including: a light source assembly which emits light; a light guide plate which receives at a light incident surface thereof light from the light source assembly and guides the received light; a bottom chassis having a side wall unit at one side of which the light source assembly is disposed, and a bottom unit on which the light guide plate is disposed; and a light absorbing member disposed in the bottom unit of the bottom chassis. The bottom unit of the bottom chassis has a first bottom portion which is arranged in the vicinity of the light incident surface of the light guide plate and has a first recess, a second bottom portion which is bent diagonally to the cross sectional surface of the first bottom portion and has a second recess, and a third bottom portion which is bent at the second bottom portion in the direction parallel to the first bottom portion and disposed higher than the first bottom portion. The light absorbing member is disposed in the first and second recesses.

The first bottom portion may be formed to have a thickness in that the thickness of the first bottom portion in a region with the first recess is different from the thickness of the first bottom portion in a region without first recess.

The light absorbing member inserted in the first recess and the second recess may be formed of materials different from each other.

The light absorbing member may be formed of a material having a light absorption rate of 95% to 99% in a visible light region.

The light absorbing member may be any one selected from a colorant, a tape, ink, plastic, rubber and a mixture thereof.

The light absorbing member may be a dichroic filter which absorbs light of a predetermined wavelength.

The dichroic filter may absorb light of any one selected from a yellowish green wavelength, a greenish blue wavelength and a bluish purple wavelength.

The light absorbing member having an adjusted light absorption rate and an adjusted light reflection rate may be disposed in either the first recess or the second recess.

The light absorbing member of a gray color may be disposed in either the first recess or the second recess.

The light guide plate may have a light incident region arranged in the vicinity of the light incident surface, and a light emitting region which guides and emits the received light. The thickness of the light emitting region and the thickness of the light incident region may be the same.

The light guide plate may have a light incident region arranged in the vicinity of the light incident surface, a light emitting region which guides and emits the received light, and a tapered region interposed between the light emitting region and the light incident region. The thickness of the light incident region may be thicker than the thickness of the light emitting region.

The first bottom portion may be arranged in the vicinity of the light incident region, the third bottom portion may be arranged in the vicinity of the light emitting region, and the second bottom portion may be arranged in the vicinity of the tapered region.

The third bottom portion may further have a third recess.

According to another embodiment of the present invention, there is provided a backlight unit including a light source assembly which emits light; a light guide plate which receives at a light incident surface thereof light from the light source assembly and guides the received light; a bottom chassis having a side wall unit at one side of which the light source assembly is disposed, and a bottom unit on which the light guide plate is disposed; and a light absorbing member disposed in the bottom unit of the bottom chassis. The light guide plate has a light incident portion arranged in the vicinity of the light incident surface, a light emitting portion which guides and emits the light, and a tapered portion interposed between the light emitting portion and the light incident portion. The thickness of the light incident portion is thicker than the thickness of the light emitting portion.

The bottom chassis may have a first bottom portion arranged in the vicinity of the light incident surface of the light guide plate, a second bottom portion which is bent diagonally to the first bottom portion, and a third bottom portion which is bent at the second bottom portion in the direction parallel to the first bottom portion and disposed higher than the first bottom portion. The light absorbing member may be disposed in the second bottom portion and a part of the first bottom portion connected to the second bottom portion.

The length of the light incident portion may be adjustable.

The tapered portion may be rounded.

The thickness of the light incident portion may be thicker than the thickness of the light emitting portion.

The light absorbing member may be any one selected from a colorant, a tape, ink, plastic, rubber and a mixture thereof.

According to another embodiment of the present invention, there is provided a liquid crystal display device including a backlight unit; and a liquid crystal panel disposed on the backlight unit, the backlight unit including a light source assembly which emits light; a light guide plate which receives at a light incident surface thereof light from the light source assembly and guides the received light; a bottom chassis having a side wall at one side of which the light source assembly is disposed, and a bottom unit on which the light guide plate is disposed; and a light absorbing member disposed in the bottom unit of the bottom chassis. The bottom unit of the bottom chassis has a first bottom portion which is arranged in the vicinity of the light incident surface of the light guide plate and has a first recess, a second bottom portion which is bent diagonally to the first bottom portion and has a second recess, and a third bottom portion which is bent at the second bottom portion in the direction parallel to the first bottom portion and disposed higher than the first bottom portion. The light absorbing member is disposed in the first and second recesses.

The other aspects of the present invention will be described in detail in the detailed description of the present invention and attached drawings.

Embodiments of the present invention may exhibit effects described below.

According to the embodiments of the present invention, light leakage may be minimized to achieve improved uniformity of luminance.

The foregoing general description and the following detailed description are exemplary and explanatory and are intended to provide further explanation of the claimed subject matter.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE ILLUSTRATED EMBODIMENTS

Figure 1:
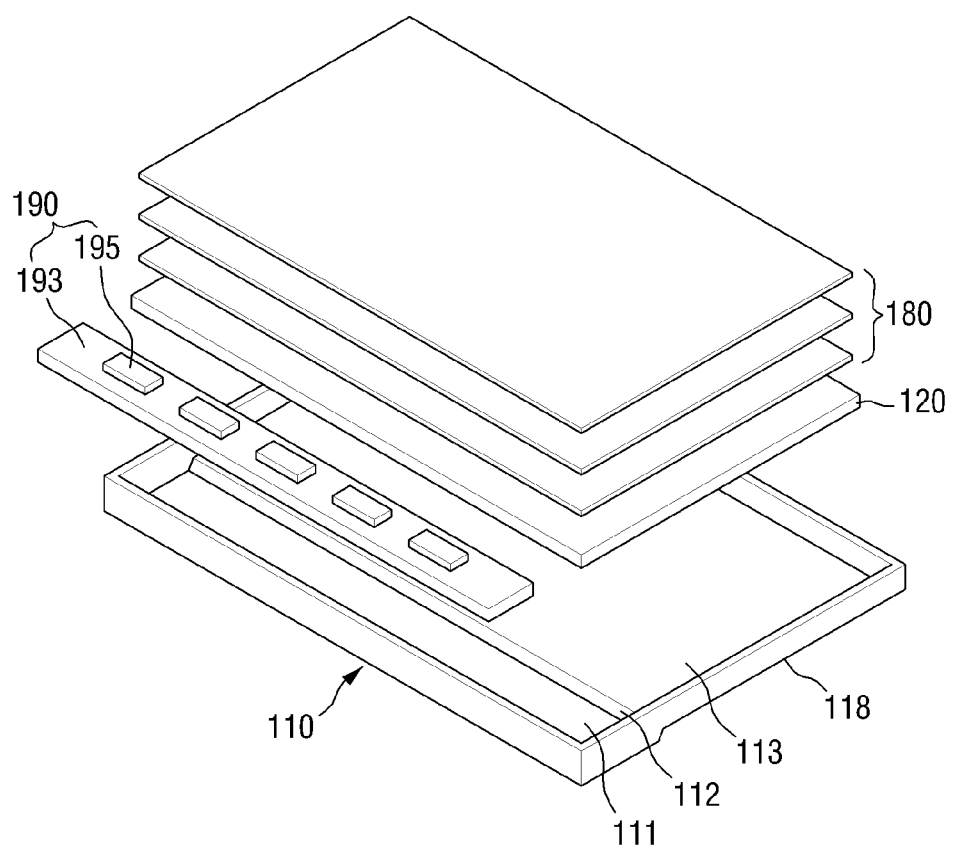
FIG. 1 is an exploded perspective diagram of a backlight unit according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals indicate identical components throughout. In the drawings, the thickness or relative thickness of layers and dimensions or relative dimensions of regions may be exaggerated for clarity.

The terms "first", "second" and the like may be used to describe various components, but the components are not limited by such terms. The terms are used only for the purpose of distinguishing one component from other components. Therefore, it will be apparent that a first component as referred hereinafter may be a second component within the technical idea of the present invention. As used herein, singular forms are intended to include plural forms as well, unless the context clearly indicates otherwise. It will be further understood that the terms such as "including" or "having," when used in this specification, specify the presence of stated features, integers, steps, operations, components, parts or a mixture thereof, but do not preclude the presence or addition of one or more other features, integers, steps, operations, components, parts or mixtures thereof.

Spatially relative terms, such as "below," "beneath," "lower," "above," "upper" and the like, may be used herein for ease of description to describe one element or component's relationship to another element(s) or component(s) as illustrated in the figures. It will be understood that the spatially relative terms are intended to encompass different orientations of the element in use or operation in addition to the orientation depicted in the figures. For example, if the element in the figures is turned over, elements described as "below" or "beneath" other elements would then be oriented "above" the other elements. Thus, the exemplary term "below" can encompass both orientations of above and below. The element may be otherwise oriented and the spatially relative descriptors used herein may be interpreted accordingly.

Embodiments of the present invention will now be described with reference to the drawings.

Figure 2:
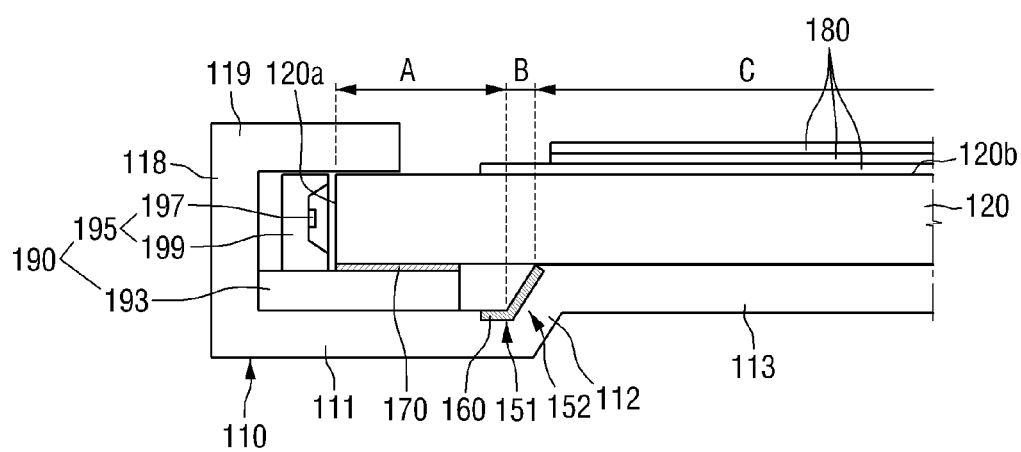
FIG. 2 is a cross-sectional view of the backlight unit according to the embodiment of the present invention.
Figure 3:
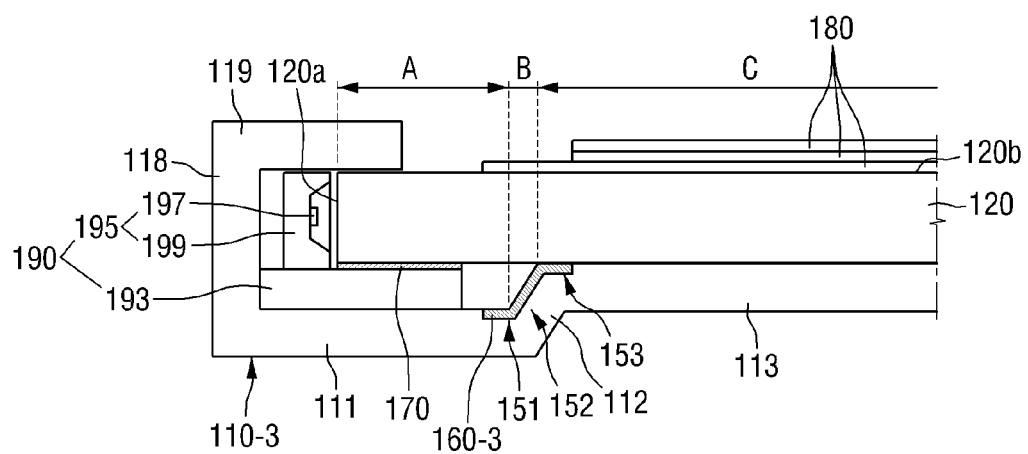
FIG. 3 is a cross-sectional view of the backlight unit of FIG. 2 according to a modified embodiment of the present invention.

FIG. 1 is an exploded perspective diagram of a backlight unit according to an embodiment of the present invention. FIG. 2 is a cross-sectional view of the backlight unit according to the embodiment of the present invention. FIG. 3 is a cross-sectional view of the backlight unit of FIG. 2 according to a modified embodiment of the present invention.

Referring to FIGS. 1 and 2, a backlight unit 10 is a device for changing a point light source or a linear light source into a surface light source. The backlight unit 10 includes a light source assembly 190 including a light source 197, a light guide plate 120 for guiding light, a bottom chassis 110 which accommodates therein the light guide plate 120 and the light source assembly 190, and a light absorbing member 160 disposed in bottom portions 111, 112 and 113 of the bottom chassis 110.

The light source assembly 190 may include a light source package 195 and a circuit board 193. The light source package 195 may be mounted on the circuit board 193.

The circuit board 193 may be any one of a flexible printed circuit (FPC), a double side flexible circuit film, a printed circuit board (PCB), a metal core printed circuit board (MCPCB) and a metal printed circuit board (MPCB), however, the circuit board 193 is not limited thereto.

The light source package 195 may receive driving power through the circuit board 193 to generate light. Although not shown in the drawings, the circuit board 193 may be electrically connected to a power supply (not shown) so as to receive the driving power from the power supply and transmit the received power to the light source 197.

The light source package 195 may include a light source 197 for emitting light, and a mold unit 199 for supporting/accommodating the light source 197. The light source package 195 may emit light through one side thereof. That is, one side of the light source package 195 may be a light emitting surface for emitting light.

The light source package 195 may include the light source 197 such as light emitting diodes (LEDs), and the mold unit 199 having an embedding portion for supporting/accommodating the light source 197. One side of the light source package 195 may serve as a light emitting surface for emitting light from the light source.

The light source 197 may be embedded in the embedding portion of the mold unit 199, and in this case, may provide light through one side of the mold unit 199. As discussed later, one side of the light source package 195, that is, the light emitting surface faces a light incident surface 120a of the light guide plate 120.

The backlight unit 10 may include the light guide plate 120 for guiding light provided from the light source assembly 190. The light guide plate 120 may have the light incident surface 120a for incidence of light emitted from the light source assembly 190, and may have a serration pattern to improve the quantity of incident light.

Furthermore, the light guide plate 120 may have a light emitting surface 120b which changes the traveling direction of incident light and emits the light in a certain direction. For example, in cases where the light guide plate 120 is employed in a display device, the light guide plate 120 may guide light provided from the light source assembly 190 to a display panel.

The light guide plate 120 may be formed into a square plate shape, and may be made of a transparent material which refracts light. In an exemplary embodiment, the transparent material may be transparent polymer resin such as polycarbonate or polymethyl methacrylate, however, the transparent material is not limited thereto. Furthermore, the light guide plate 120 may be made of a rigid material, but is not limited thereto and may be made of a flexible material. The light guide plate 120 may have a rectangular plate shape.

In addition, one side of the light guide plate 120 with the light incident surface 120a may be overlapped with the circuit board 193. That is, one side of the light guide plate 120 with the light incident surface 120a may be disposed on the circuit board 193. An adhesive member 170 for fixing the light guide plate 120 may be arranged in the overlapped region between the light guide plate 120 and the circuit board 193. Dual tapes or the like can be used as the adhesive member 170.

In this case, light provided from the light source 197 may be leaked in the direction of the adhesive member 170 instead of being incident to the light incident surface 120a of the light guide plate 120. Light leaked in the direction of the adhesive member 170 may travel toward a tapered region B which will be discussed later.

An optical sheet 180 may be disposed on the light emitting surface 120b of the light guide plate 120. The optical sheet 180 may serve to control light emitted from the light source 197 or modulate optical characteristics of the emitted light. The optical sheet 180 may include a diffusion sheet, a prism sheet and a protection sheet sequentially laminated on the light emitting surface 120b of the light guide plate 120. At least one of the diffusion sheet, the prism sheet and the protection sheet may be stacked into plural to be used as the optical sheet 180, and any one of the three sheets may be omitted as needed.

The backlight unit 10 may include the bottom chassis 110 which accommodates the light guide plate 120 and the light source assembly 190. The bottom chassis 110 may have a side wall unit 118 at one side of which the light source assembly 190 is disposed, and bottom portions 111, 112 and 113 on which the light guide plate 120 is disposed. Furthermore, the backlight unit 10 may include the light absorbing member 160 arranged in the bottom portions 111, 112 and 113 of the bottom chassis 110.

The bottom chassis 110 may be made of a rigid material, for example, a plastic material or a metal material. Furthermore, the bottom chassis 110 may be made of a light-reflective material, for example, aluminum (Al) or the like. Accordingly, the bottom chassis 110 may have a reflective inner surface, and thus may reflect light emitted from the light source 197 toward the light guide plate 120, however, the bottom chassis 110 is not limited thereto. That is, the bottom chassis 110 itself may be made of a material that does not reflect light, however, in this case, the inner surface of the bottom chassis 110 may be coated with a separate reflective material to form a reflective surface.

The bottom chassis 110 may have the bottom portions 111, 112 and 113, and the side wall unit 118 extending upwardly from edges of the bottom portions 111, 112 and 113. Furthermore, the bottom chassis 110 may selectively have a top unit 119 which is bent at the side wall unit 118 and arranged in the direction parallel to the bottom portions 111, 112 and 113.

The bottom portions 111, 112 and 113 of the bottom chassis 110 may be the first bottom portion 111 arranged in the vicinity of the light incident surface 120a, the second bottom portion 112 bent diagonally to the first bottom portion 111, and the third bottom portion 113 bent at the second bottom portion 112 in the direction parallel to the first bottom portion 111.

The third bottom portion 113 may be disposed higher than the first bottom portion 111. The circuit board 193 may be mounted on the circuit board 193, and the circuit board 193 may be fixed on the first bottom portion 111. In an exemplary embodiment, the circuit board 193 may be fixed on the first bottom portion 111 via an adhesive or the like.

The second bottom portion 112 may be interposed between the first bottom portion 111 and the third bottom portion 113 in such a manner that the cross-sectional surface of the second bottom surface 112 may be diagonally tilted. The second bottom portion 112 may be formed such that the cross-sectional surface thereof may be diagonally tilted, thereby slimming the backlight unit 10.

Thus, the region in which the first bottom portion 111 and the light incident surface 120a of the light guide plate 120 are overlapped with each other is defined as a light incident region A, the region in which the second bottom portion 112 and the light guide plate 120 are overlapped with each other is defined as a tapered region B, and the region in which the third bottom portion 113, the light guide plate 120 and the optical sheet 180 are overlapped with each other is defined as a light emitting region C.

Furthermore, a first recess 151 may be formed in a part of the first bottom portion 111, and a second recess 152 may be formed in the second bottom portion 112. The first and second recesses 151 and 152 may be formed through an injection molding process, a laser process, etc.

The light absorbing member 160 may be disposed in the first and second recesses 151 and 152. The light absorbing member 160 may be formed of a material having a light absorption rate of 95% to 99% in a visible light region. The light absorbing member 160 may be, for example, any one selected from a colorant, a tape, ink, plastic, rubber and a mixture thereof.

Alternatively, a dichroic filter which absorbs light of a predetermined wavelength may be employed as the light absorbing member 160. In the event of using the dichroic filter as the light absorbing member 160, the dichroic filter may absorb light of any one selected from a yellowish green wavelength, a greenish blue wavelength and a bluish purple wavelength.

Alternatively, the light absorbing member 160 having an adjusted light absorption rate and an adjusted light reflection rate may be disposed in either the first recess 151 or the second recess 152. For example, the light absorbing member 160 of a gray color may be disposed in either the first recess 151 or the second recess 152.

As shown in FIG. 2, a portion of light provided from the light source 197 may be leaked toward the adhesive member 170 in the tapered region B and a portion of the light incident region A. That is, a portion of incident light and reflected light may leak.

However, the backlight unit 10 according to the present embodiment may have the light absorbing member 160 which is disposed in the first and second recesses 151 and 152 in the light incident region A and tapered region B, thereby absorbing light being leaked. Thus, a hot spot phenomenon in which a dark region undesirably exists due light leakage may be prevented.

In detail, the possibility of occurrence of light leakage may be higher in the tapered region B. For example, if the light absorbing member 160 is arranged only in the tapered region B, light may leak in a part of the first bottom portion 111, however, light being leaked may be absorbed in the tapered region B in which the light absorbing member 160 exists, thereby minimizing light leakage. On the contrary, light leakage may occur in the first bottom portion 111 with the result that the tapered region B is relatively darker.

Therefore, the light absorbing member 160 may extend from the tapered region B to the first recess 151 of the first bottom portion 111 so as to thereby minimize the hot spot phenomenon in which a darker region might exist in the interface between the light incident region A and the tapered region B relatively to the brightness of an adjacent region.

As described above, the backlight unit 10 according to the present embodiment may have the light absorbing member 160 arranged in the light incident region A and tapered region B, thereby reducing the probability of occurrence of the aforementioned light leakage and thus preventing the hot spot phenomenon.

Referring to FIG. 3, a backlight unit 10-3 according to a modified embodiment of the present invention may further have a third recess 153 formed in a part of the third bottom portion 113, the third recess 153 being extended from the first and second recesses 151 and 152 of the respective first and second bottom portions 111 and 112 of a bottom chassis 110-3. The third recess 153 may be formed in a part of the light emitting region C. Furthermore, a light absorbing member 160-3 may be arranged throughout the first, second and third recesses 151, 152 and 153.

The backlight unit 10-3 according to the modified embodiment of the present invention may have the light absorbing member 160-3 which is arranged in the first, second and third recesses 151, 152 and 153 formed in the light incident region A, tapered region B and the light emitting region C, thereby absorbing light being leakage and improving the probability of preventing the hot spot phenomenon.

In this case, the reason why the first recess 151 in the first bottom portion 111 and the third recess 153 in the third bottom portion 113 are further employed and why the light absorbing member 160-3 is arranged in the first, second and third recesses 151, 152 and 153 are same as those described with reference to FIG. 2. In detail, the light absorbing member 160-3 may be extended from the tapered region B to the first recess 151 of the first bottom portion 111 and to the third recess 153 of the third bottom portion 113, thus improving the probability of minimizing the hot spot phenomenon in which a darker region might exist in the interface between the light incident region A and the tapered region B and in the interface between the tapered region B and the light emitting region C relatively to the brightness of an adjacent region.

As discussed above, the backlight unit 10-3 of the present embodiment may have the light absorbing member 160-3 arranged all over the light incident region A, the tapered region B and the light emitting region C, thereby lowering the probability of light leakage and thus preventing the hot spot phenomenon.

Figure 4:
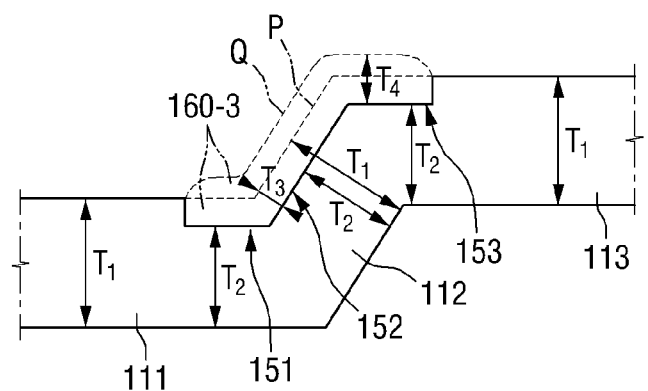
FIG. 4 is a partial cross-sectional view of a bottom unit of the backlight unit according to the modified embodiment of the present invention.
Figure 5:
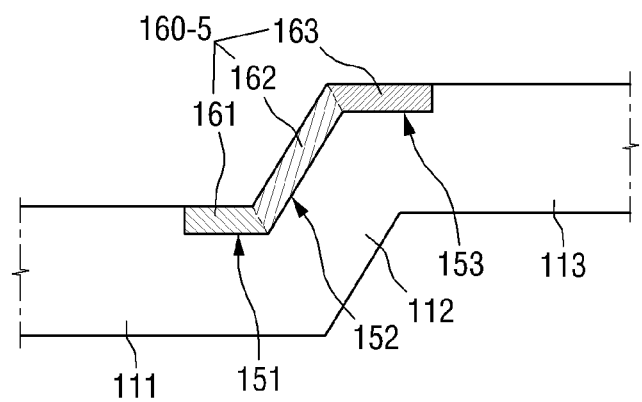
FIG. 5 is a cross-sectional view of a light absorbing member of the backlight unit according to another modified embodiment of the present invention.

FIG. 4 is a partial cross-sectional view of a bottom unit of the backlight unit according to the modified embodiment of the present invention, and FIG. 5 is a cross-sectional view of a light absorbing member of the backlight unit according to another modified embodiment of the present invention. In this case, the backlight units 10 and 10-3 described with reference to FIG. 1 to FIG. 3 are cited for ease of explanation, and the description will be provided specifically with the example of FIG. 3, and the duplicated elements will be omitted or briefly described.

Referring to FIG. 4, the first bottom portion 111 from among the first and second bottom portions 111 and 112 of the backlight unit 13 according to the modified embodiment of the present invention may have certain thickness T1. The region of the first bottom portion 111 in which the first recess 151 is formed may be stepped due to the first recess 151. Thus, the region of the first bottom portion 111 in which the first recess 151 is formed may have thickness T2. Furthermore, the third recess 153 may be selectively formed in the third bottom portion 113, wherein the thickness of third recess 153 may be formed similarly to the thickness of first recess 151.

The second recess 152 may be formed throughout the second bottom portion 112 to enable the second bottom portion 112 to have thickness T2.

The light absorbing member 160-3 may be arranged in the first, second and third recesses 151, 152 and 153. The light absorbing member 160-3 may fill the first, second and third recesses 151, 152 and 153 to make thickness T1 same as those of the first and third bottom portions 111 and 113. That is, as shown in the drawings, the light absorbing member 160-3 may fill the first, second and third recesses 151, 152 and 153 so that the light absorbing member 160-3 may have height P. In other words, the light absorbing member 160-3 may fill the first, second and third recesses 151, 152 and 153 so that thickness T2 becomes same as those T1 of the first and third bottom portions 111 and 113 and the light absorbing member 160-3 may have thickness T3 which is T1 minus T2.

Alternatively, light absorbing member 160-3 may be arranged larger than the thickness of first, second and third recesses 151, 152 and 153. That is, the light absorbing member 160-3 may be arranged into thickness T4 in the first, second and third recesses 151, 152 and 153. Thus, the light absorbing member 160-3 may be arranged in the first, second and third recesses 151, 152 and 153 so that the light absorbing member 160-3 may have height Q.

As described above, the light absorbing member 160-3 may be arranged in the first, second and third recesses 151, 152 and 153 so as to absorb light being leaked and prevent light leakage.

Referring to FIG. 5, a light absorbing member 160-5 made of different materials may be arranged in the first, second and third recesses 151, 152 and 153.

For example, the light incident region A may have relatively less amount of light leakage due to the existence of an area shielded by the circuit board 193 or the like. A first light absorbing member 161 of a gray color having an adjustable light absorption rate may be arranged in the first recess 151 formed in the light incident region A.

Furthermore, as the third bottom portion 113 in the light emitting region C may be arranged in an upper section of the light leakage area, less light leakage may occur in the third bottom portion 113. Therefore, a third light absorbing member 163 having an adjustable light absorption rate may be arranged in the third recess 153 in the light emitting region C. For example, the third light absorbing member 163 such as a dichroic filter which can minimize the transmittance of a color of a specific wavelength may be arranged.

A greater quantity of light leakage may occur in the tapered region B relatively to the light incident region A and the light emitting region C. Therefore, a second light absorbing member 162 which can absorb a relatively greater quantity of light leakage may be arranged in the second recess 152 in the tapered region B. For example, a colorant, a tape, ink, plastic, rubber and the like may be employed as the second light absorbing member 162.

As described above, the backlight unit 10-3 according to the modified embodiment of the present invention may have the light absorbing member 160-5 made of different materials in regions having different quantities of light leakage, thus minimizing the problem of hot spots in consideration of the quantity of light leakage and providing uniform luminance.

FIG. 6 to FIG. 10 are cross-sectional views of a backlight unit according to another embodiment of the present invention. In this case, the backlight units described with reference to FIG. 1 to FIG. 5 are cited, and the duplicated elements will be omitted or briefly described.

Figure 6:
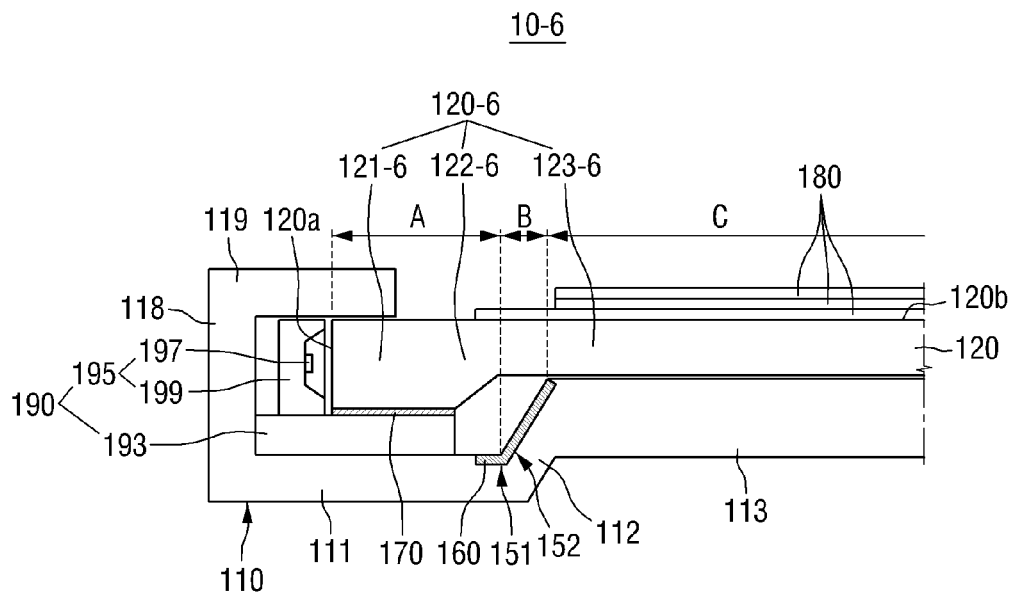
FIG. 6 is a cross-sectional view of a backlight unit according to another embodiment of the present invention.

Referring to FIG. 6, a backlight unit 10-6 may include the light source assembly 190, the bottom chassis 110, the light absorbing member 160 and a light guide plate 120-6. In this case, FIG. 6 differs from FIG. 1 to FIG. 5 in that the light guide plate 120-6 has a tapered portion 122-6.

The light guide plate 120-6 may include a light incident portion 121-6 disposed on the light incident surface 120a, a light emitting portion 123-6 for guiding light provided to the light incident portion 121-6 to the light emitting surface 120b, and the tapered portion 122-6 connected between the light incident portion 121-6 and the light emitting portion 123-6.

Furthermore, the light incident portion 121-6 may be arranged in the light incident region A, the tapered portion 122-6 may be arranged in the tapered region B, and the light emitting portion 123-6 may be arranged in the light emitting region C.

In this case, the light incident portion 121-6 of the light guide plate 120-6 may have a thickness thicker than that of the light emitting portion 123-6 of the light guide plate 120-6. In such a manner, the thickness of the light emitting portion 123-6 of the light guide plate 120-6 may be reduced to slim the backlight unit 10-6. The light incident portion 121-6 of the light guide plate 120-6 may be thicker than the light emitting portion 123-6 since reducing the size of the light incident surface 120a is restricted in consideration of the size of the light source package 195 and a quantity of incident light.

In other words, if the thickness of the light incident portion 121-6 is reduced to be similar to the thickness of the light emitting portion 123-6, light leakage may increase due to the restriction in the size of the light source package 195. Therefore, it is required that the light incident portion 121-6 has the light incident surface 120a having the size corresponding to the size of the light source package 195.

The thickness of the light emitting portion 123-6 of the light guide plate 120-6 may be reduced to slim the backlight unit 10-6, and the tapered portion 122-6 may be arranged to interconnect the light incident portion 121-6 and the light emitting portion 123-6 which have different thickness.

In the tapered portion 122-6, reflection of light may be impaired due to an error of design in a reflection pattern (not shown) formed in a lower part of the light guide plate 120-6 with the result of a great amount of light leakage in the tapered region B.

The light absorbing member 160 may be arranged in a part of the first bottom portion 111 and in the second bottom portion 112 in the tapered region B having a greater amount of light leakage such that the light absorbing member 160 may fill the first and second recesses 151 and 152.

As described above, the backlight unit 10-6 can be slimmed by changing the shape of the light guide plate 120-6, and the light leakage caused due to the change in the shape of the light guide plate 120-6 can be absorbed by a light absorbing member 160-6, thus minimizing the hot spot phenomenon and providing uniform luminance.

Figure 7:
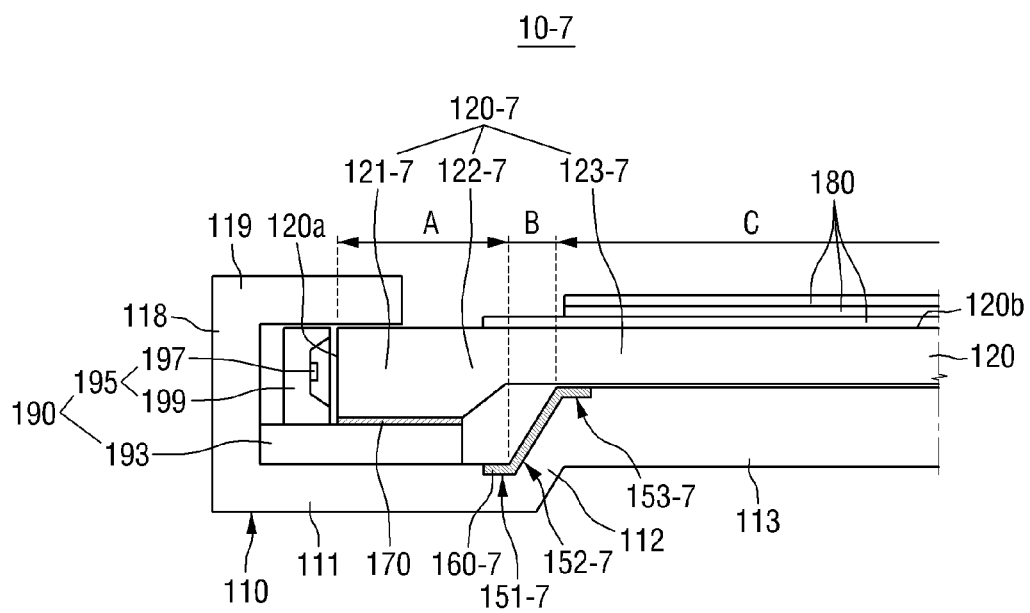
FIG. 7 is a cross-sectional view of a backlight unit according to another embodiment of the present invention.

Referring to FIG. 7, unlike the backlight unit described with reference to FIG. 6, a backlight unit 10-7 may have a third recess 153-7 formed in the third bottom portion 113, and a light absorbing member 160-7 may be arranged in the third recess 153-7.

The backlight unit 10-7 may have the light absorbing member 160-7 which is disposed in first, second and third recesses 151-7, 152-7 and 153-7 in the respective light incident region A, the tapered region B and the light emitting region C, thereby absorbing light being leaked and improving the probability of preventing the hot spot phenomenon.

In detail, the light guide plate 120-7 may have a light incident portion 121-7 arranged in the vicinity of the light incident surface 120a, a tapered portion 122-7, and a light emitting portion 123-7 thinner than the light incident portion 121-7. In this case, a greater amount of light leakage than a flat light guide plate may occur in the tapered portion 122-7 of the light guide plate 120-7 due to an error in the reflection pattern of the light guide plate 120-7. Therefore, the probability of occurrence of light leakage may be higher in the tapered region B.

In this case, if the light absorbing member 160-7 is arranged only in the tapered region B for example, light leakage may occur in a part of the first bottom portion 111, and light being leaked may be absorbed in the tapered region B where the light absorbing member 160-7 exists to thus minimize light leakage. On the contrary, light leakage may occur in the first bottom portion 111 to cause the tapered region B to be relatively darker.

Therefore, the light absorbing member 160-7 may be extended from the tapered region B to the first recess 151-7 of the first bottom portion 111 and the third recess 153-7 of the third bottom portion 113, thereby minimizing the hot spot phenomenon in which a darker region might exist in the interface between the light incident region A and the tapered region B and in the interface between the tapered region B and the light emitting region C relatively to the brightness of an adjacent region.

As discussed above, the backlight unit 10-7 according to the present embodiment may have the light absorbing member 160-7 which is arranged in the light incident region A, light emitting region C and the tapered region B, thereby reducing the probability of occurrence of aforementioned light leakage and thus preventing the hot spot phenomenon. Thus, the backlight unit 10-7 according to the present embodiment may provide uniform luminance.

Figure 8:
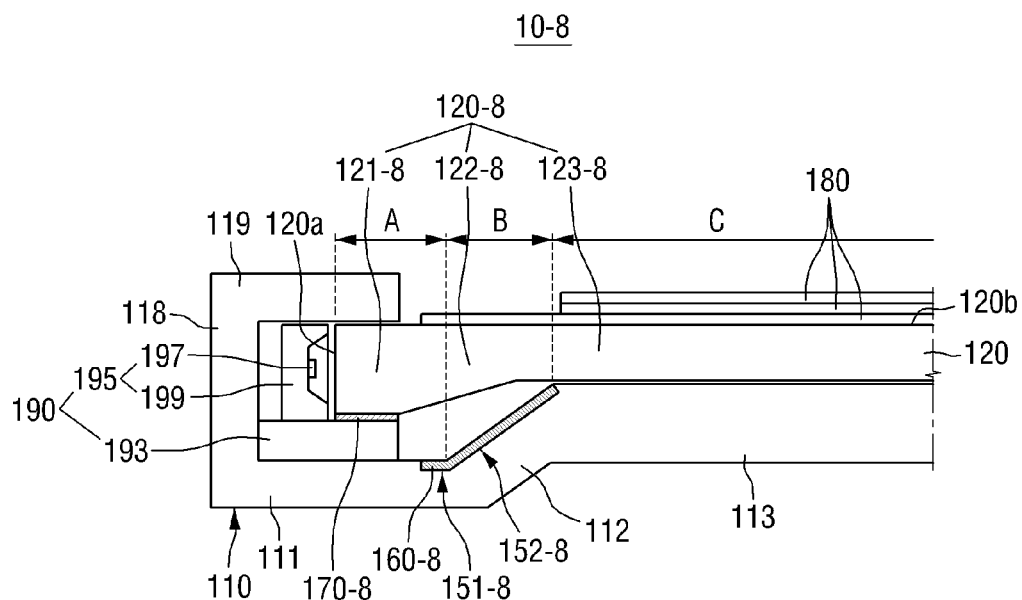
FIG. 8 is a cross-sectional view of a backlight unit according to another embodiment of the present invention.
Figure 9:
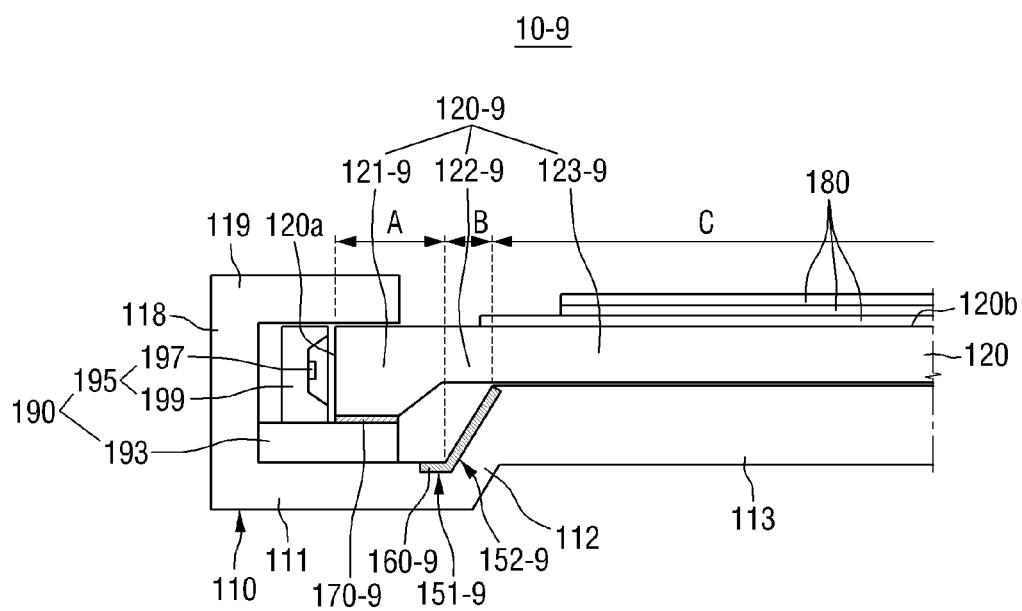
FIG. 9 is a cross-sectional view of a backlight unit according to another embodiment of the present invention.

Referring to FIG. 8 and FIG. 9, unlike the backlight unit described with reference to FIG. 6, backlight units 10-8 and 10-9 may reduce a light leakage area by adjusting the size of light incident portions 121-8 and 121-9 of respective light guide plates 120-8 and 120-9.

In backlight units 10-8 and 10-9, the respective light guide plates 120-8 and 120-9 may be mounted on a portion of the circuit board 193. In this case, the light guide plates 120-8 and 120-9 may be fixed by adhesive members 170-8 and 170-9 interposed between the circuit board 193 and light incident portions 121-8 and 121-9 of the light guide plates 120-8 and 120-9. In this case, light leakage may occur through the adhesive members 170-8 and 170-9.

Therefore, the size of the light incident portions 121-8 and 121-9 of the respective light guide plates 120-8 and 120-9 and the size of the adhesive members 170-8 and 170-9 may be adjusted to minimize a light leakage area in FIGS. 8 and 9.

In this case, FIG. 8 and FIG. 9 are different from each other in that the tapered angles of the tapered portions 121-8 and 121-9 of the light guide plates 120-8 and 120-9 are different from each other in the tapered region B. The tapered angle of the tapered portion 121-8 may be lower in FIG. 8 than the tapered angle of the tapered portion 121-9 in FIG. 9, and the tapered angle of the tapered portion 121-9 may be higher in FIG. 9 than those in FIG. 8. Accordingly, the tapered angle of the second bottom portion 112 in FIG. 8 may be different from the tapered angle of the second bottom 112 in FIG. 9.

As shown in FIG. 8, the tapered angle of the tapered portion 121-8 may be lower, and thus a second recess 152-8 may be formed into a wide area in the second bottom portion 112. Thus, an optical absorbing member 160-8 may be arranged in the wide area to thereby easily absorb light being leaked.

As shown in FIG. 9, the tapered portion 121-9 may have a higher tapered angle and thus may be arranged in the vicinity of a light leakage area so as to absorb leaked light upon occurrence of light leakage. That is, the probability of reflecting the leaked light in another area may be minimized to thus achieve minimized probability of occurrence of light leakage.

As discussed above, the backlight units 10-8 and 10-9 according to the present embodiment may minimize the light leakage area to reduce light leakage, and may absorb leaked light by the light absorbing members 160-8 and 160-9 disposed in the tapered region B, thereby minimizing the hot spot phenomenon caused by light leakage and providing uniform luminance.

Figure 10:
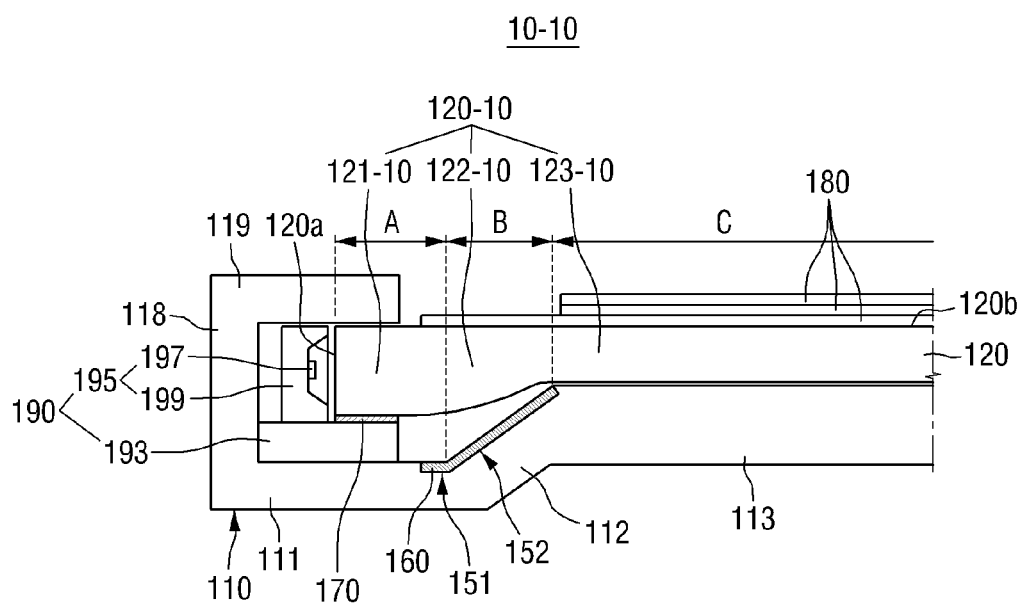
FIG. 10 is a cross-sectional view of a backlight unit according to another embodiment of the present invention.

Referring to FIG. 10, unlike the backlight unit described with reference to FIG. 6, a backlight unit 10-10 may have a light guide plate 120-10 with a rounded tapered portion 122-10.

The backlight unit 10-10 may have the light guide plate 120-10 arranged in the light incident region A, the tapered region B and the light emitting region C, wherein the light guide plate 120-10 may have a light incident portion 121-10, a light emitting portion 123-10 and the tapered portion 122-10. The tapered portion 122-10 may be formed into a round shape.

The tapered portion 122-10 having the round shape may be expected to reduce a quantity of light leakage as compared with the tapered portion having a straight-line tapered shape. In other words, while the tapered portion having a straight-line tapered shape may have an error in a reflection pattern to cause leakage of a greater part of light, the tapered portion 122-10 having the round shape may reduce the probability of occurrence of light leakage due to the round shape.

As discussed above, the backlight unit 10-10 according to the present embodiment may minimize the probability of occurrence of light leakage and absorb leaked light by the light absorbing member 160-10 disposed in the tapered region B, thus minimizing the hot spot phenomenon caused by light leakage and providing uniform luminance.

Figure 11:
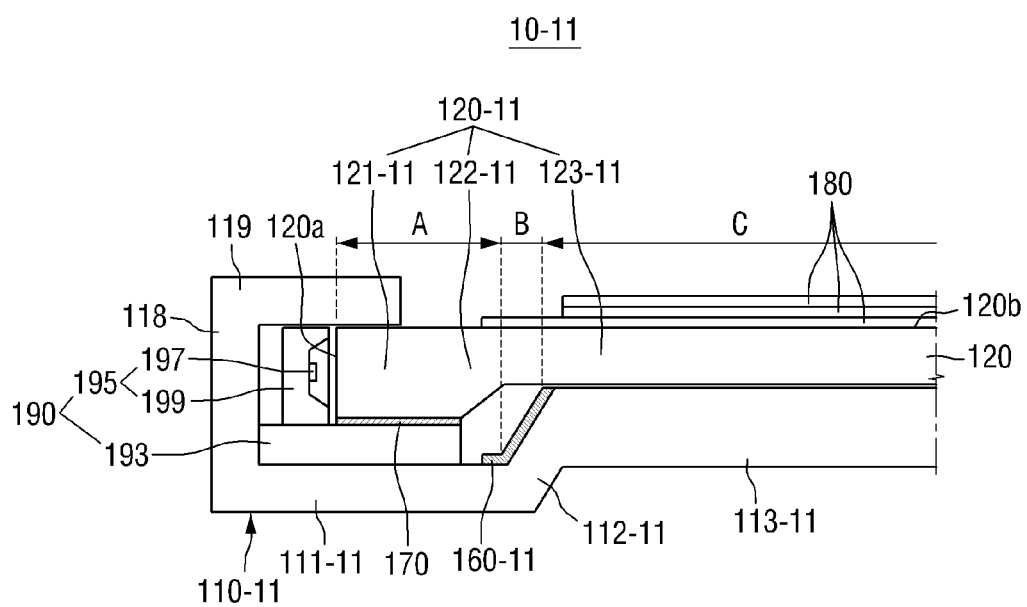
FIG. 11 is a cross-sectional view of a backlight unit according to another embodiment of the present invention.

FIG. 11 is a cross-sectional view of a backlight unit according to another embodiment of the present invention. In this case, the backlight units described with reference to FIG. 6 to FIG. 10 are cited, and the duplicated elements will be omitted or briefly described.

Referring to FIG. 11, a backlight unit 10-11 may absorb leaked light by a light absorbing member 160-11 disposed in the light incident region A and the tapered region B so as to thereby prevent the hot spot phenomenon.

Unlike the backlight units of FIG. 6 to FIG. 10, the backlight unit shown in FIG. 11 does not have first, second and third recesses 151, 152 and 153 in first to third bottom portions 111-11, 112-11 and 113-11. A predetermined space may be formed in the tapered region B in which a tapered portion 122-11 of a light guide plate 120-11 and the second bottom portion 112-11 are formed. The light absorbing member 160-11 may be disposed in the space.

Thus, the backlight unit 10-11 of the present embodiment is advantageous in that the process for forming first, second and third recesses 151, 152 and 153 in a bottom unit 110-11 can be omitted, and the process for arranging the light absorbing member 160-11 in the first, second and third recesses 151, 152 and 153 can also be omitted, thus enabling the light absorbing member 160-11 to be easily disposed on the bottom unit 110-11.

As described above, the backlight unit 10-11 according to the present embodiment may have the light absorbing member 160-11 disposed on the first and second bottom portions 111-11 and 112-11, thus enabling the light absorbing member 160-11 to be easily disposed, and preventing hot spots and providing uniform luminance.

Figure 12:
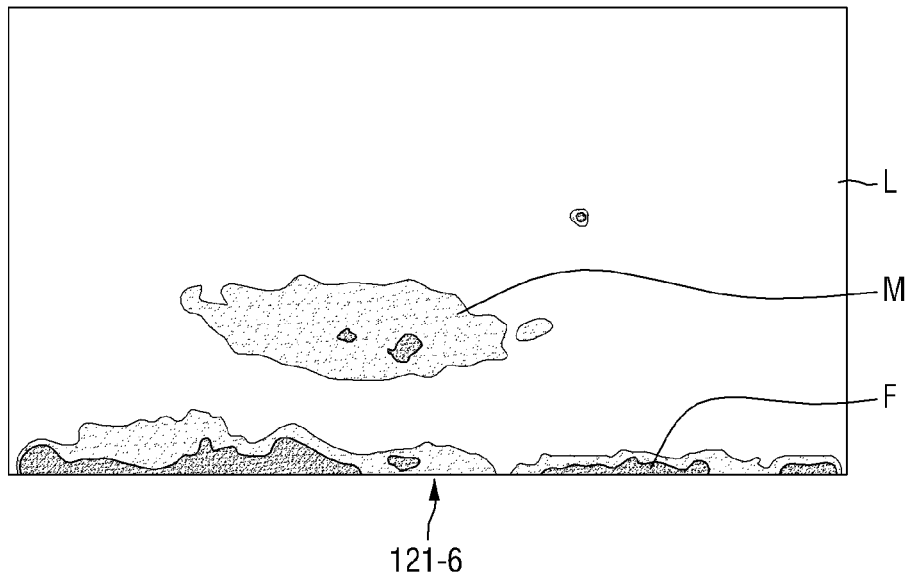
FIG. 12 is a plane view illustrating the degree of light leakage of a backlight unit which employs a light absorbing member according to an embodiment of the present invention.
Figure 13:
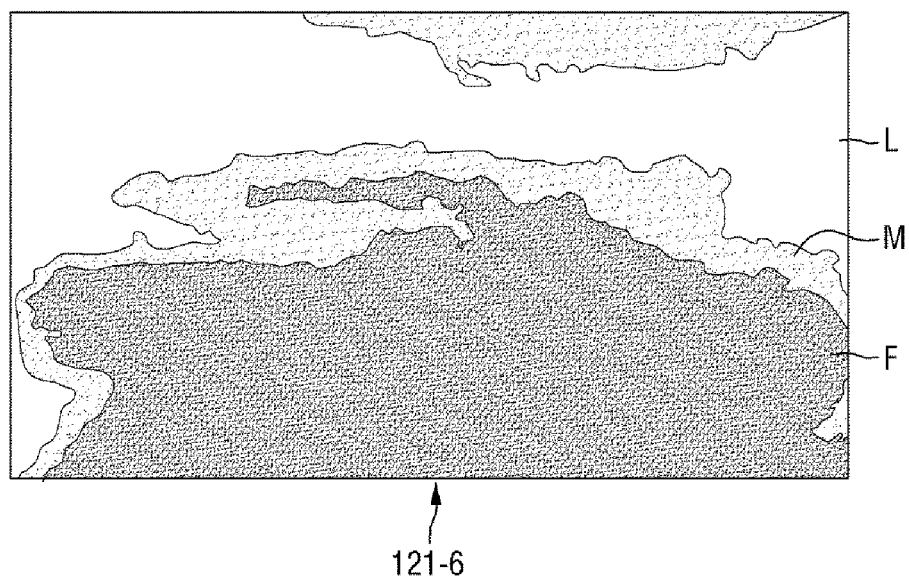
FIG. 13 is a plane view illustrating the degree of light leakage of a backlight unit of FIG. 12 which employs no light absorbing member according to an experimental example of the present invention.
Figure 14:
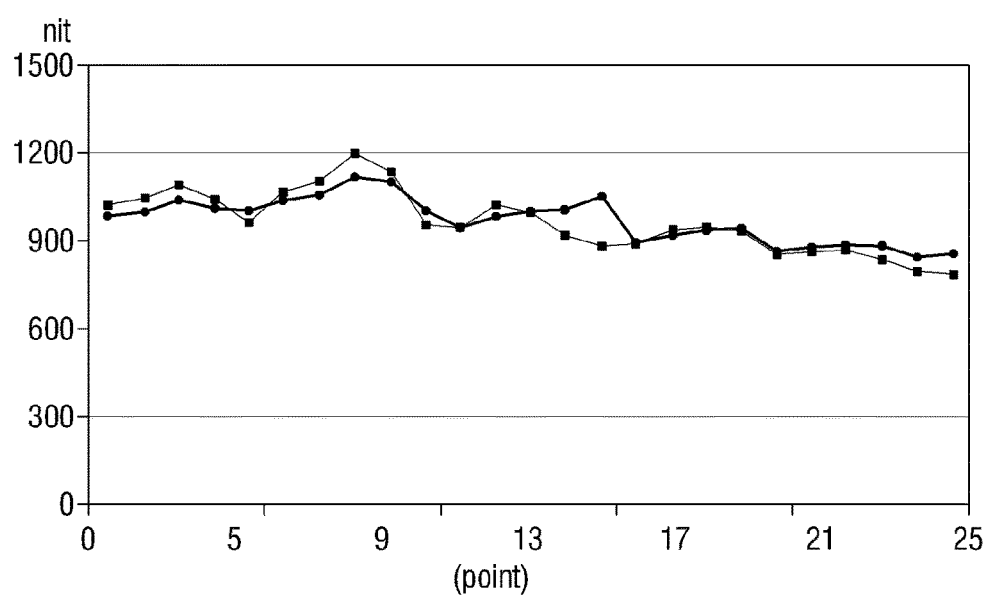
FIG. 14 is a graphical representation illustrating the result of the measurement of the average luminance of the backlight unit of FIG. 12 and FIG. 13.

FIG. 12 is a plane view illustrating the degree of light leakage of a backlight unit which employs a light absorbing member according to an embodiment of the present invention. FIG. 13 is a plane view illustrating the degree of light leakage of a backlight unit of FIG. 12 which employs no light absorbing member according to an experimental example of the present invention. FIG. 14 is a graphical representation illustrating the result of the measurement of the average luminance of the backlight unit of FIG. 12 and FIG. 13.

In this case, the backlight units described with reference to FIG. 1 to FIG. 11 are cited for the backlight unit of FIGS. 12 and 13, and the duplicated elements will be briefly described or omitted. In this case, the description will be provided specifically citing the example of FIG. 6.

Referring to FIGS. 12 and 13, the backlight unit 10-6 may have a problem of light leakage. The light leakage may cause hot spots in which a dark region undesirably exists. The hot spots may degrade the quality of the backlight unit 10-6.

The region in which the light leakage occurs is the tapered region B existing near the light incident portion 121-6, and corresponds to the second bottom portion 112 and the tapered portion 122-6 of the light guide plate 120-6.

In this case, the region may be divided, based on the quantity of light leakage, into a first region F with a greater quantity of light leakage, a second region M with some light leakage and a third region L with little light leakage.

First, as shown in FIG. 12, the area of the first region F in which a greater quantity of light leakage occurs near the light incident portion 121-6 of the backlight unit 10-6 according to an embodiment of the present invention is relatively smaller as compared with the experimental example.

On the other hand, as shown in FIG. 13, the area of the first region F near the light incident portion 121-6 is relatively larger as compared with the area of the first region F of the embodiment. That is, luminance is slightly increased due to light leakage in the experimental example.

Furthermore, it is ascertained that the area of the second region M is shown to partially exist in FIG. 12, however, the area of the second region M is shown to exist all over in FIG. 13. In addition, it is ascertained that the third region L with little or no light leakage is large in FIG. 12, however, the third region L exists only partially in FIG. 13.

To ascertain this, twenty-five points are set in each of the embodiment and experimental example, and the average luminance for these twenty-five points is measured. Table 1 shows the result of the measurement of the average luminance. In this case, the twenty-five points may be arranged at constant spacing.

TABLE 1

|  | Embodiment | Experimental example |
|---|---|---|
| Average luminance (nit) of 25 points | 970.18 | 972.61 |

As shown in Table 1, the average luminance measured in each of the embodiment and the experimental example is at the similar level.

In the experimental example of FIG. 13, the luminance of the backlight unit may increase due to the region in which light leakage has occurred. In the experimental example, the area of the first region F with increased light leakage may increase to thus increase the luminance, however, the area adjacent the first region F with the increased luminance may have a relatively lower luminance to make this adjacent area relatively darker. Thus, it may be determined that the adjacent area is relatively darker due to the luminance increased by the light leakage.

It is ascertained that the luminance of the backlight unit 10-6 of the embodiment of FIG. 12 is similar to that of the experimental example, as shown in Table 1, and the backlight unit 10-6 produces a uniform luminance all over the whole surface thereof. That is, it may be determined that light leakage may merely degrade luminance uniformity of the backlight unit 10-6 and may not improve sharpness despite of the increased luminance.

As discussed above, it may be determined that the backlight unit 10-6 having the light absorbing member 160 for preventing light leakage has little or no degradation of luminance. Thus, the backlight unit 10-6 according to the present embodiment may have luminance uniformity and thus improved quality without causing luminance degradation.

Figure 15:
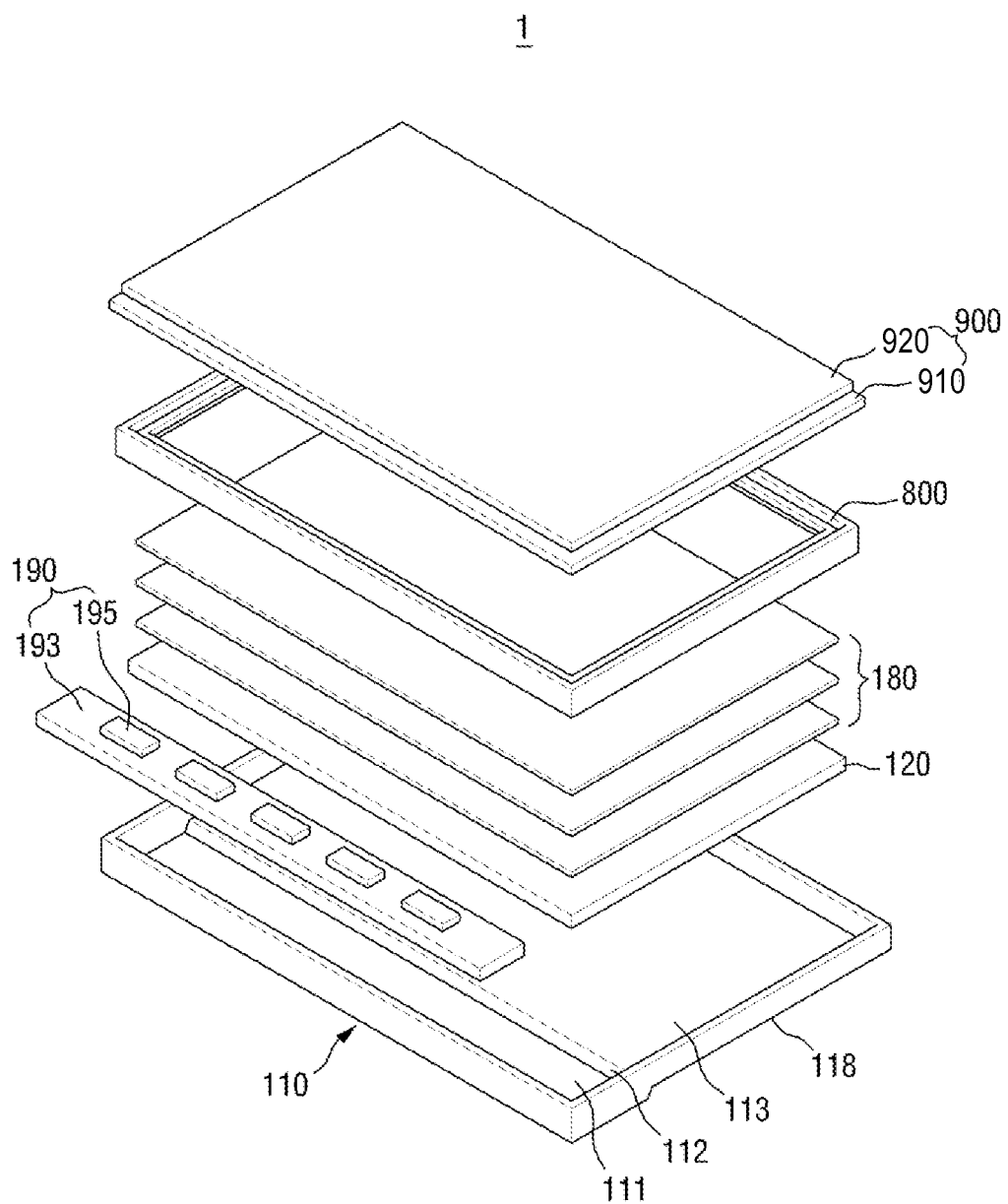
FIG. 15 is an exploded perspective diagram of a liquid crystal display device including a backlight unit according to an embodiment of the present invention.
Figure 16:
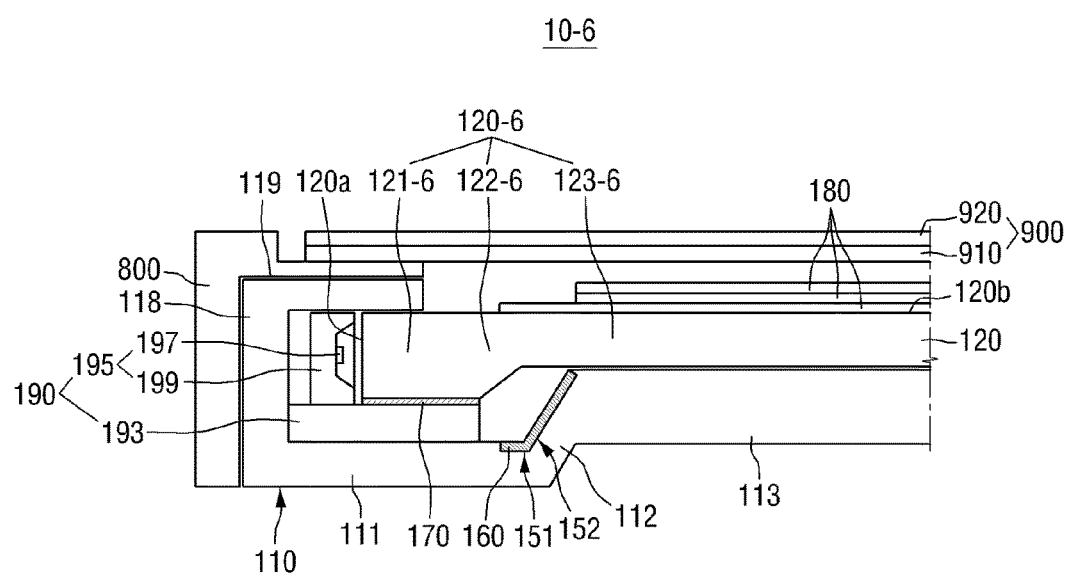
FIG. 16 is a cross-sectional view of the liquid crystal display device including a backlight unit according to an embodiment of the present invention.

FIG. 15 is an exploded perspective diagram of a liquid crystal display device including a backlight unit according to an embodiment of the present invention, and FIG. 16 is a cross-sectional view of the liquid crystal display device including a backlight unit according to an embodiment of the present invention.

Referring to FIG. 15 and FIG. 16, a liquid crystal display device 1 according to an embodiment of the present invention may include a display panel 900 and a backlight assembly 10-6.

The liquid crystal display panel 900 is a panel for displaying images, and may include a first substrate 910 having a plurality of pixels, a second substrate 920 facing the first substrate 910, and a liquid crystal layer (not shown) interposed between the first substrate 910 and the second substrate 920.

Although not shown in the drawings, a plurality of gate lines and data lines may be arranged in vertical and horizontal directions on the first substrate 910 to define a plurality of pixel regions, and a thin film transistor serving as a switching element may be formed in each pixel region, and a pixel electrode may be formed on the pixel region. Furthermore, the thin film transistor may include a gate electrode connected to the gate line, a semiconductor layer formed by stacking amorphous silicon and the like on the gate electrode, and a source electrode and a drain electrode formed on the semiconductor layer and connected to the data line and pixel electrode.

The second substrate 920 may include a color filter made up of a plurality of sub color filters for realizing red, green and blue colors, and a black matrix which divides the sub color filters and shields light permeating through the liquid crystal layer.

Although not shown in FIG. 16, the liquid crystal panel 900 may include a driving unit and a flexible circuit board attached to the first substrate 910 or the second substrate 920. The driving unit may apply various signals such as a driving signal required for displaying images in a display region. The flexible circuit board may output various signals to the driving unit.

The aforementioned first substrate 910 and second substrate 920 facing each other may be mutually adhered by a sealant (not shown) arranged along an outer periphery of the display region so as to form the liquid crystal display panel 900, and the adhesion of the first substrate 910 and the second substrate 920 may be performed through the use of an alignment key (not shown) formed at the first substrate 910 or the second substrate 920. In this case, as the first substrate 910 may have an area larger than the area of the second substrate 920, a pad region which is a predetermined part of the first substrate 910 extending from an edge of the second substrate 920 may be obtained, and one end of the flexible circuit board may be attached to the pad region.

The liquid crystal display device 1 may further include a first polarizing plate and a second polarizing plate which are arranged tightly onto and beneath the liquid crystal display panel 900, respectively. The first polarizing plate may have a transmissive axis in a first direction to polarize light in the first direction, and the second polarizing plate may have a transmissive axis in a second direction to polarize light in the second direction.

The backlight unit 10-6 for providing light to the liquid crystal panel 900 may be arranged underneath the liquid crystal panel 900. The backlight unit 10-6 may include the light guide plate 120-6, the light source assembly 190, the optical sheet 180 and the bottom chassis 110. The backlight unit 10-6 may further include a mold frame 800 between the liquid crystal display panel 900 and the optical sheet 180.

The light guide plate 120-6 may include the light incident portion 121-6, the tapered portion 122-6 and the light emitting portion 123-6. The light incident portion 121-6 may be disposed to correspond to the light incident region A, and the tapered portion 122-6 may be disposed to correspond to the tapered region B. The light emitting portion 123-6 may be disposed to correspond to the light emitting region C.

The light absorbing member 160 may be disposed in a part of the light incident region A and in the tapered region B. In this case, the probability of light leakage may be higher in the tapered region B. However, when the light absorbing member 160 is disposed only in the tapered region B, a hot spot phenomenon may occur in which the tapered region B is relatively darker due to the light leakage occurring in the adjacent area.

Therefore, the light absorbing member 160 may also be arranged in a part of the first bottom portion 111 in the light incident region A so as to minimize the hot spot phenomenon. Moreover, the light absorbing member 160 may be further selectively disposed in a part of the third bottom portion 1113 in the light emitting region C for a similar reason.

As discussed above, the light absorbing member 160 for absorbing leaked light may be disposed in the bottom unit 110, thereby enabling the backlight unit 10 to provide uniform luminance and thus enabling the liquid crystal display device 1 to provide a screen with uniform luminance.

Although exemplary embodiments of the present invention have been described, it is understood that the invention should not be limited to these exemplary embodiments, and those skilled in the art will appreciate that many other variations and adaptations can be made without departing from the substantial features of the exemplary embodiments of the present invention. For example, variations can be made to each component described in detail in the exemplary embodiments of the present invention. Moreover, differences related to such variations and adaptations should be construed as being embraced within the scope of the present invention defined by the appended claims.

What is claimed is:

1. A backlight unit comprising:
a light source assembly configured to emit light;
a light guide plate comprising a light incident surface, the light guide plate being configured to receive light from the light source assembly at the light incident surface and guide the received light;
a bottom chassis comprising a side wall unit at one side of which the light source assembly is disposed, and a bottom unit on which the light guide plate is disposed; and
a light absorbing member disposed in the bottom unit of the bottom chassis,
wherein the bottom unit of the bottom chassis comprises:
a first bottom portion arranged in a vicinity of the light incident surface of the light guide plate, the first bottom portion comprising a first recess;
a second bottom portion bent diagonally to the cross-sectional surface of the first bottom portion, the second bottom portion comprising a second recess; and
a third bottom portion bent at the second bottom portion in a direction parallel to the first bottom portion, the third bottom portion being disposed higher than the first bottom portion,
wherein the light absorbing member is disposed in the first and second recesses.

2. The backlight unit of claim 1, wherein a thickness of the first bottom portion in a region with the first recess is different from a thickness of the first bottom portion in a region without the first recess.

3. The backlight unit of claim 1, wherein the light absorbing member inserted in the first recess and the second recess is formed of materials different from each other.

4. The backlight unit of claim 1, wherein the light absorbing member is formed of a material having a light absorption rate of 95% to 99% in a visible light region.

5. The backlight unit of claim 1, wherein the light absorbing member is any one selected from a colorant, a tape, ink, plastic, rubber, and a mixture thereof.

6. The backlight unit of claim 1, wherein the light absorbing member is a dichroic filter configured to absorb light of a predetermined wavelength.

7. The backlight unit of claim 1, wherein:
the light absorbing member comprises a portion having a particular light absorption rate and a particular light reflection rate; and
the portion of the light absorbing member is disposed in either the first recess or the second recess.

8. The backlight unit of claim 7, wherein the portion of the light absorbing member is of a gray color.

9. The backlight unit of claim 1, wherein:
the light guide plate comprises:
 a light incident region arranged in vicinity of the light incident surface; and
 a light emitting region configured to guide and emit the received light; and
a thickness of the light emitting region and a thickness of the light incident region are the same.

10. The backlight unit of claim 1, wherein:
the light guide plate comprises:
 a light incident region arranged in vicinity of the light incident surface;
 a light emitting region configured to guide and emit the received light; and
 a tapered region interposed between the light emitting region and the light incident region; and
thickness of the light incident region is greater than thickness of the light emitting region.

11. The backlight unit of claim 10, wherein the first bottom portion is arranged in vicinity of the light incident region, the third bottom portion is arranged in vicinity of the light emitting region, and the second bottom portion is arranged in vicinity of the tapered region.

12. The backlight unit of claim 1, further comprising a third recess in the third bottom portion.

13. A backlight unit comprising:
a light source assembly configured to emit light;
a light guide plate comprising a light incident surface, the light guide plate being configured to receive light from the light source assembly at the light incident surface and guide the received light;
a bottom chassis comprising a side wall unit at one side of which the light source assembly is disposed, and a bottom unit on which the light guide plate is disposed; and
a light absorbing member disposed on the bottom unit of the bottom chassis,
wherein the light guide plate comprises:
 a light incident portion arranged in a vicinity of the light incident surface;
 a light emitting portion configured to guide and emit at least some of the received light; and
 a tapered portion interposed between the light emitting portion and the light incident portion, and wherein:
 a rear surface of the light emitting portion of the light guide plate is flat; and
 the light absorbing member partially has an inclined shape with respect to the rear surface of the light emitting portion of the light guide plate.

14. The backlight unit of claim 13, wherein:
the bottom chassis comprises:
 a first bottom portion arranged in vicinity of the light incident surface of the light guide plate;
 a second bottom portion bent diagonally to the first bottom portion; and
 a third bottom portion bent at the second bottom portion in a direction parallel to the first bottom portion, the third bottom portion being disposed higher than the first bottom portion; and
the light absorbing member is disposed in the second bottom portion and a part of the first bottom portion connected to the second bottom portion.

15. The backlight unit of claim 13, wherein the tapered portion overlaps a portion of the light absorbing member.

16. The backlight unit of claim 13, wherein the tapered portion is rounded.

17. The backlight unit of claim 13, wherein a thickness of the light incident portion is thicker than a thickness of the light emitting portion.

18. The backlight unit of claim 13, wherein the light absorbing member is any one selected from a colorant, a tape, ink, plastic, rubber, and a mixture thereof.

19. A liquid crystal display device comprising:
a backlight unit; and
a liquid crystal panel disposed on the backlight unit,
wherein the backlight unit comprises:
 a light source assembly configured to emit light;
 a light guide plate comprising a light incident surface, the light guide plate being configured to receive light from the light source assembly and guide the received light;
 a bottom chassis comprising a side wall at one side of which the light source assembly is disposed, and a bottom unit on which the light guide plate is disposed; and
 a light absorbing member disposed in the bottom unit of the bottom chassis,
wherein the bottom unit of the bottom chassis comprises:
 a first bottom portion arranged in a vicinity of the light incident surface of the light guide plate, the first bottom portion comprising a first recess;
 a second bottom portion bent diagonally to the first bottom portion, the second bottom portion comprising a second recess; and
 a third bottom portion bent at the second bottom portion in a direction parallel to the first bottom portion, the third bottom portion being disposed higher than the first bottom portion, and
wherein the light absorbing member is disposed in the first and second recesses.

* * * * *